United States Patent [19]

Lapin

[11] Patent Number: 4,654,379
[45] Date of Patent: Mar. 31, 1987

[54] SEMI-INTERPENETRATING POLYMER NETWORKS

[75] Inventor: Stephen C. Lapin, Rolling Meadows, Ill.

[73] Assignee: Allied Corporation, Morristown, N.J.

[21] Appl. No.: 804,763

[22] Filed: Dec. 5, 1985

[51] Int. Cl.$^4$ .................. C08G 63/02; C08L 1/10; C08L 93/00

[52] U.S. Cl. .................. 522/15; 522/25; 522/31; 522/72; 522/88; 525/54.2; 526/238.21

[58] Field of Search .................. 522/6, 15, 25, 31, 72, 522/88; 525/54.2; 527/300, 313; 526/238.21

[56] References Cited

U.S. PATENT DOCUMENTS

| | | | |
|---|---|---|---|
| 3,708,296 | 1/1973 | Schlesinger | 96/33 |
| 3,709,805 | 1/1973 | Krauch et al. | 522/72 |
| 3,711,390 | 1/1973 | Feinberg | 522/88 |
| 3,711,391 | 1/1973 | Feinberg | 522/88 |
| 3,721,616 | 3/1973 | Watt | 522/88 |
| 4,056,391 | 11/1977 | Turner et al. | 522/88 |
| 4,058,400 | 11/1977 | Crivello | 96/86 |
| 4,058,401 | 11/1977 | Crivello | 96/115 |
| 4,069,054 | 1/1978 | Smith | 96/115 |
| 4,069,056 | 1/1978 | Crivello | 96/115 |
| 4,090,936 | 5/1978 | Barton | 522/88 |
| 4,150,988 | 4/1979 | Crivello | 522/25 |
| 4,173,476 | 11/1979 | Smith et al. | 430/280 |
| 4,227,978 | 10/1980 | Barton | 522/107 |
| 4,250,203 | 2/1981 | Schlesinger | 427/44 |
| 4,256,828 | 3/1981 | Smith | 522/88 |
| 4,264,703 | 4/1981 | Crivello | 430/270 |
| 4,371,605 | 2/1983 | Renner | 522/50 |

*Primary Examiner*—John Kight
*Assistant Examiner*—Nathan M. Nutter
*Attorney, Agent, or Firm*—Thomas K. McBride; John F. Spears, Jr.; Raymond H. Nelson

[57] ABSTRACT

Semi-interpenetrating polymer networks which may be used as printing inks or as coatings are prepared by subjecting a mixture of a vinyl ether and a cellulose ester to irradiation from an electron beam. This mixture is curable with low energy dosages ranging from about 0.1 to about 10.0 Mrads, and from about 150 to about 300 Kev. The reaction is effected in the presence of a polymerization catalyst comprising an onium salt.

33 Claims, No Drawings

SEMI-INTERPENETRATING POLYMER NETWORKS

BACKGROUND OF THE INVENTION

Polymeric coatings which are used in packaging various material may comprise polymeric films. In many instances, the films comprise polyacrylates prepared by radiation curing of acrylate monomer and oligomers. However, there are certain disadvantages present when using this type of coating, especially when the coating may come in contact with edible materials. This is due to the fact that portions of the uncured acrylate material may leach out of the coating or film and be absorbed by the edible material. Therefore, it is necessary to provide some new type of coating or film, especially for materials which will be used in aseptic food packaging. In addition, another disadvantage which is present when utilizing uncured acrylate material in industry is a possible sensitivity of workers to the material thereby involving potential disruption of work due to health problems of the workers.

Generally speaking, it is desirable in the coating industry to use materials which, in their natural state, are in the form of free flowing liquids which may then undergo a rapid phase change to a solid state. The phase change which is undergone by the monomeric or polymeric material should occur at a rate which is commensurate with the processing steps which are contiguous to the process. The coating industry may utilize various methods to effect or produce the desired phase change. For example, the conversion of various compounds from the liquid state to the solid state as exemplified by paints, inks, coatings, etc. will undergo a phase change as the volatile solvent which is employed to provide the liquid phase is driven off. Alternatively, another method of effecting the desired phase change may be used when employing a two-component system in which a chemical reaction between the components causes or effects the change in the phases. In addition, there are also systems where a phase change is effected as a result of a polymerization reaction or a cross-linking reaction to produce a material which possesses a higher molecular weight than the monomeric or oligomeric compound.

The polymerization of a monomer or a polymer precursor may occur by a thermoactivation of the compound or it may occur by the application of radiant energy to the monomer or oligomer compound. When utilizing the latter approach to polymerization, two types of radiation are most commonly used, said radiation involving ultraviolet light or electron beam energy. Although both types of radiation may be used to induce a polymerization reaction, the types are quite different in nature. Ultraviolet light is selectively absorbed by molecules which possess appropriate chromophores. Wave lengths which are generally applied will range from about 500 to about 200 nm (57 to 143 Kcal/mol). This range will provide sufficient energy to place a molecule in an electronically excited state; however, it does not provide enough energy to directly ionize most molecules. The electronically excited molecules may react to produce a species which is capable of initiating a polymerization reaction, or they may decay back to the ground state.

In contradistinction to this, electron beams comprise streams of charged particles which have been generated by a cathode ray gun. The electrons will usually possess given energies ranging from about 100 to about 500 Kev (2300 to 1150 Kcal/mol). This energy is more than sufficient to easily ionize any organic material. The thus-ionized species may then take part in a polymerization reaction.

Most of the commercial coatings which have been cured by the application of ultraviolet light contain a photoinitiator along with monomers and/or oligomers which possess terminal acrylate functional groups. The photoinitiator is present to absorb the light and thereafter react to form a radical species This radical species initiates a rapid long-chain polymerization with the acrylic double bonds to produce the polymeric film which comprises the cured coating.

In addition, almost all of the commercial systems which are curable by use of an electron beam also contain acrylated monomers and oligomers. However, it is not necessary to utilize photoinitiators in these acrylate systems inasmuch as electron beams afford sufficient energy to directly ionize the acrylates. As also hereinbefore set forth, the acrylates comprise extremely useful materials for radiation cured systems. They possess cure speeds which are comparable to other process steps and in addition, a wide range of acrylated monomers and oligomers are commercially available in sufficient quantity to enable manufacturers to produce many different types of radiation cured products.

While acrylates are cured by free radical polymerization, it is also possible to effect the desired result by utilizing a cure system which comprises cationic polymerization. In U.S. Pat. No. 3,708,296, this type of polymerization was described wherein aryldiazonium salts were decomposed by ultraviolet light to produce a Lewis acid. The thus produced Lewis acid would then catalize the cationic polymerization of epoxy funtionalized monomers and oligomers. However, a major disadvantage which is present when utilizing the diazonium salts lies in the fact that these compounds are relatively unstable by nature and thus result in a product which has limited shelf life. U.S. Pat. Nos. 3,721,616, 3,711,390 and 3,711,391 describe various additives which may be added to the formulation in a attempt to stabilize the systems. However, in spite of the use of the gelation inhibitors, the mixtures still possessed an instability which made them generally unacceptable for commercial coatings.

U.S. Pat. Nos. 4,058,400 and 4,058,401 speak to the use of certain aromatic onium salts of Group VI A elements which may be used to catalyze a cationic polymerization reaction utilizing ultraviolet light irradiation as an energy source. The coatings which were prepared when using sulfonium salt initiators possessed significantly greater stability when compared to similar compositions which had been prepared but which had used a diazonium salt as an initiator. The latter patent speaks mainly to the polymerization of epoxy compounds while the former speaks to other cationically polymerizable materials which include multifunctional vinyl ether monomers.

Other U.S. Patents also disclose radiation induced cationic polymerization. For example, U.S. Pat. No. 4,069,054 describes the photosensitized decomposition of aromatic sulfonium salts. The use of such salts improves the spectral response of the system and thus allows irradiation at longer ultraviolet wave lengths. U.S. Pat. No. 4,069,056 also describes the use of Group V A aromatic onium salts as radiation sensitive catalysts for cationic polymerization. U.S. Pat. No. 4,090,936 describes a hybrid photohardenable composition containing mixtures of epoxides which have been cured by a cationic polymerization and acrylates which have been cured by a radical polymerization reaction.

Another U.S. Pat. No., namely 4,173,476, describes an initiator comprising an aromatic sulfonium salt which possesses a structure different in nature than those previously used. It is asserted in this patent that the use of such a photoinitiator will result in the formation of thick films, that is, up to about ½" in thickness resulting from polymerization of epoxide compounds. U.S. Pat. No. 4,250,203 utilizes the presence of an organic sulfur compound scavenger in cationic polymerization reactions to reduce or eliminate the sulfur odor which is generated upon the photodecomposition of the sulfonium salt photoinitiator. U.S. Pat. No. 4,264,703 also describes the use of aromatic iodonium salts as radiation sensitive catalysts for cationic polymerization.

As will hereinafter be set forth in greater detail, it has now been discovered that a semi-interpenetrating polymer network composition may be prepared by treating a mixture of a vinyl ether and a cellulose ester in the presence of a polymerization catalyst comprising an onium salt by treating the mixture with irradiation emanating from an electron beam source. The resulting composition will find a wide variety of uses of the type hereinafter set forth in greater detail.

BRIEF SUMMARY OF THE INVENTION

This invention relates to inter-penetrating polymer networks. More particularly, the invention is concerned with semi-interpenetrating polymer networks which may be utilized in various ways including printing inks or coatings for aseptic food packaging. The products of the present invention are obtained by subjecting a vinyl ether and a cellulose ester to irradiation from an electron beam in the presence of an onium salt which acts as the polymerization catalyst for the reaction. As was hereinbefore set forth, polymer coatings have been prepared by subjecting polymer precursors to irradiation such as that afforded by ultraviolet light in the presence of a photoinitiator. In this type of reaction the irradiation from the light source activates the initiator which then decomposes to form a Lewis acid and thus causes the reaction or polymerization to be effected. In contradistinction to this type of reaction, the reaction of the present invention primarily involves the ionization of the vinyl ether and the cellulose. These ionized species will then activate the polymerization catalyst. Once the activation of the onium salt takes place it then acts as in a catalytic manner to provide a mechanism which results in the formation of a polymer material which comprises a semi-interpenetrating network of the cellulose ester and the polyvinyl ether. The resulting coating will exhibit desirable characteristics which will include a good gloss, a flexibility, as well as good adhesion characteristics. In addition, by utilizing an electron beam as the energy source in place of an ultraviolet light it is possible to eliminate an undesirable characteristic which is present when utilizing the latter energy source, inasmuch as when electron beam irradiation is used, sulfonium salts will not decompose into products which produce the characteristic sulfur odor. In addition, as will hereinafter be shown in greater detail in the examples which are found at the end of the specification, another advantage which is present when employing the process of the present invention lies in the cure speed necessary to effect the transition from the liquid phase to the solid phase. It has been found that the phase change of the present process will occur at a rate which is commensurate with contiguous processing steps and thus will contribute to the overall efficiency of said process with a concurrent production of the desired product.

It is, therefore, an object of this invention to provide a polymeric material which comprises a semi-interpenetration polymer network.

A further object of this invention is to provide polymeric materials which may be utilized in a variety of ways among which is a use of these materials as coatings for food packaging.

In one aspect an embodiment of this invention resides in a polymerizable composition comprising a mixture of a vinyl ether, a cellulose ester, and a polymerization catalyst comprising an onium salt.

Another embodiment of this invention is found in a polymeric composition comprising a semi-interpenetrating polymer network of a polyvinyl ether and a cellulose ester.

Yet another embodiment of this invention will be found in a process for the preparation of a polymeric composition comprising a semi-interpenetrating polymer network of a polyvinyl ether and a cellulose ester which comprises subjecting a mixture of at least one vinyl ether and a cellulose ester to irradiation from an electron beam at low dosages in the presence of a polymerization catalyst comprising an onium salt at polymerization conditions and recovering the resultant semi-interpenetrating polymer network composition.

A specific embodiment of this invention resides in a polymerizable composition comprising a mixture of triethylene glycol divinyl ether, a cellulose acetate butyrate, and 4-di-t-butylphenyl iodonium hexafluoroantimony.

Another specific embodiment of this invention resides in a polymeric composition comprising a semi-interpenetrating polymer network of poly(triethylene glycol divinyl ether) and a cellulose acetate buterate.

Yet another specific embodiment of this invention is found in a process for the preparation of a polymeric composition comprising a semi-interpenetrating polymer network of a poly(vinyl ether) and a cellulose ester which comprises subjecting a mixture of triethylene glycol divinyl ether and a cellulose acetate buterate to irradiation from an electron beam at a dosage in the range of from about 0.1 to about 10.0 Mrads, and from about 150 to 300 Kev in the presence of 4-di-t-butylphenyl iodonium hexafluoroantimony at a temperature in the range of from about ambient to 50° C., in recovering the resultant semi-interpenetrating polymer network composition.

Other objects and embodiments will be found in the following further detailed description of the invention.

DETAILED DESCRIPTION OF THE INVENTION

As hereinbefore set forth, the present invention is concerned with semi-interpenetrating polymer network compositions which may be utilized as printing inks or as coatings. The desired polymeric compositions which possess many desirable characteristics which are not possessed by other coatings are prepared by subjecting a mixture of a vinyl ether and cellulose ester to irradiation from an electron beam in the presence of a polymerization catalyst which comprises an onium salt. The reaction may be effected by dissolving the cellulose ester and the onium salt catalyst in the vinyl ether to produce a homogeneous solution, the viscosity of the solution being adjusted by varying the proportion of the cellulose ester present in the composition.

The vinyl ethers which are employed as one component of the reaction mixture to form the desired semi-interpenetrating polymer network will possess the generic formula:

in which R may comprise alkyl, aryl, cycloalkyl, alkoxy, aralkyl, alkaryl, arylalkoxy, or heterocyclic radical; and n may comprise an integer of from 1 to 4. Some specific examples of these vinyl ethers which may be employed will include ethyl vinyl ether, propyl vinyl ether, butyl vinyl ether, pentyl vinyl ether, hexyl vinyl ether, benzyl vinyl ether, totyl vinyl ether, cyclopentyl vinyl ether, cyclohexyl vinyl ether, 1,2-divinyloxyethane, 1,3-divinyloxypropane, 1,4-divinyloxybutane, 1,5-divinyloxypentene, 1,6-divinyloxyhexane, 1,3-divinyloxycyclopentane, 1,4-divinyloxycyclohexane, bisphenol-A-diethoxy vinyl ether, ethylene glycol divinyl ether, diethylene glycol divinyl ether, triethylene glycol divinyl ether, tetraethylene glycol divinyl ether, propylene glycol divinyl ether, dipropylene glycol divinyl ether, tripropylene glycol divinyl ether, trimethylol propane trivinyl ether, pentaerythritol trivinyl ether, pentaerythritol tetravinyl ether, ethoxylated trimethylol propane trivinyl ether, etc.

Examples of cellulose esters which may be employed as the second component which forms the semi-interpenetrating polymer network of the present invention will include cellulose acetate, cellulose propionate, cellulose buterate, cellulose acetate propionate, cellulose acetate butyrate, cellulose propionate butyrate, cellulose esters partially substituted with acrylamide groups, etc. It is to be understood that the aforementioned vinyl ethers and cellulose esters are only representative of the type of compounds which may be employed to form the desired semi-interpenetrating polymer network composition, and that the present invention is not necessarily limited thereto.

The treatment of the aforementioned vinyl ethers and cellulose esters by exposure to irradiation from an energy source comprising an electron beam will be effected in the presence of a polymerization catalyst which comprises an onium salt. The onium salt acts as a catalyst after having been activated by exposure to the aforesaid irradiation. Some examples of onium salts which may be employed as catalysts in the process of this invention will include both iodonium and sulfonium salts such as 4-di-t-butylphenyliodonium hexafluorantimony, triphenylsulfonium hexaflurophosphate, triphenylsulfonium hexafluorantimony, diphenyliodonium hexafluorophosphate, or any of the types of onium salts described by J. V. Crivello in *Advances in Polymer Science*, 62, 1984 pp 1–48. As in the case of the vinyl ethers and the cellulose esters, the aforementioned onium salts are only representative of the class of compounds which may be employed as polymerization catalysts, and that the present invention is not necessarily limited thereto.

The process by which the semi-interpenetrating polymer network compositions of the present invention may be prepared may be effected in any manner known in the art. For example, one method of preparing the desired composites is to dissolve the cellulose ester and the polymerization catalyst comprising an onium salt in the vinyl ether to produce a homogeneous solution. In the preferred embodiment of the invention, the vinyl ether is present in the mixture in an amount in the range of from 60% to about 95% by weight of the mixture, while the cellulose esters are present in an amount in the range of from about 5% to about 40% by weight of the mixture. In addition, the onium salt is present in a relatively small amount which may be in a range of from about 0.5 to about 10 parts per hundred (pph). Following the obtention of the homogeneous solution it is then exposed to the irradiation from an energy source which, in the preferred embodiment of the invention, comprises an electron beam. The energy dosage which is applied to the mixture is relatively low, that is, the energy is in a range of from about 0.1 to about 10.0 Mrads. The exposure of the solution to the energy source will be effected at polymerization conditions which will include a temperature in the range of from about ambient to about 50° C.

The resulting polymeric composition will comprise a semi-interpenetrating polymer network which is in contradistinction to composites which comprise co-polymers of the two components present in the mixture. There is no apparent phase separation of the polyvinyl ether and cellulose ester polymers. A new polymeric system is formed which possesses properties which are a combination of the two polymers. In this system the two polymers show only a physical interaction between said polymers, there being no chemical binding of the two polymer chains. This physical interaction between the two polymers means that the polymer chains become permanently entangled with one another and therefore, it is impossible to leach out or dissolve one polymer away from the other polymer. This, in turn leads to the desirable characteristics of the finished product for use in food packaging inasmuch as one of the components cannot be separated out and eventually be absorbed by the food.

The following examples are given for purposes of illustrating the semi-interpenetrating polymer networks of the present invention and to the process which is employed for preparing these composites. However, it is to be understood that these examples are given merely for purposes of illustration, and that the present invention is not necessarily limited thereto.

EXAMPLE I

A series of solutions were prepared by dissolving a cellulose ester which was partially substituted with reactive acrylamide groups in diethylene glycol divinyl ether along with a sufficient amount of a polymerization catalyst comprising a triaryl sulfonium salt of hexafluorophosphate to ensure that the catalyst would be present in an amount of 4 pph. The mixtures were coated onto a paper based substrate which had a polyethylene outer layer. Following this the mixtures were irradiated using an electron beam at an energy of 160 Kev. In addition, varying dosages were employed. The minimum dosage required to provide a tack-free cure was determined. The results of these tests are set forth in Table I below.

TABLE I

| Cellulose Derivative (wt. %) | DEGDVE[a] (wt. %) | Viscosity (cps) | Min. Dose for Tack-Free Cure (Mrads) | Gloss |
|---|---|---|---|---|
| 0 | 100 | — | <0.25 | Poor |
| 5 | 95 | 16 | 0.5 | Good |
| 10 | 90 | 60 | 0.5 | High |
| 15 | 85 | 201 | 1.0 | High |
| 20 | 80 | 690 | 1.0 | High |

[a]Diethylene glycol divinyl ether.

EXAMPLE II

In this example solutions containing varying amounts of cellulose acetate buterate were dissolved in triethylene glycol divinyl ether along with sufficient amounts of a triaryl sulfonium salt of hexafluorophosphate to ensure that the sulfonium salt which acts as a polymerization catalyst was present in an amount of 4 pph. The solutions were then coated onto a polyethylene laminated substrate and irradiated by treatment with an electron beam at an energy of 160 Kev under a nitrogen atmosphere. As in the previous experiment, varying energy dosages were employed to effect a tack-free cure. The results which were obtained with these semi-interpenetrating polymer network coatings are set forth in Table II below.

TABLE II

| CAB[a] (wt. %) | TEGDVE[b] (wt. %) | Viscosity (CPS) | Min. Dose for T.F. Cure (Mrads) | MEK Rubs @ 2 Mrads | Gloss |
|---|---|---|---|---|---|
| 0 | 100 | — | 0.5 | >100 | low |
| 5 | 95 | — | 0.5 | >100 | good |
| 10 | 90 | 160 | 0.5 | >100 | high |
| 20 | 80 | 1,510 | 0.5 | >100 | high |
| 30 | 70 | 14,300 | 1.0 | >100 | high |

[a]Cellulose acetate butyrate.
[b]Triethylene glycol divinyl ether.

EXAMPLE III

In this example the cellulose ester which was employed as one component to form the semi-interpenetrating polymer network coating comprised a cellulose acetate propionate. Varying amounts of this cellulose ester were dissolved in triethylene glycol divinyl ether and a polymerization catalyst comprising a triaryl sulfonium salt of hexafluorophosphate was also present in an amount of 3 pph. After obtaining a homogeneous solution the solution was then coated onto a polyethylene laminated substrate and irradiated by means of an electron beam having an energy of 160 Kev. The results which were obtained by these coatings are set forth in Table III below.

TABLE III

| CAP[a] (wt. %) | TEGDVE[b] (wt. %) | Viscosity (CPS) | Min. Dose for T.F. Cure (Mrads) | MEK Rubs @ 2 Mrads | Gloss |
|---|---|---|---|---|---|
| 0 | 100 | — | .5 | >100 | low |
| 5 | 95 | 40 | .5 | >100 | high |
| 7 | 93 | 94 | .5 | >100 | high |
| 9 | 91 | 212 | .5 | >100 | high |

[a]Cellulose acetate propionate.
[b]Triethylene glycol divinyl ether.

It is to be noted from the results obtained in Tables II and III that in addition to possessing a high gloss, the coatings also exhibited excellent solvent resistance in that the rubbing of the coatings 100 times with methyl ethyl ketone had no observable effect.

EXAMPLE IV

This example illustrates the difference in cure speed (energy dosage) between the systems shown in examples I–III and a commercial epoxy/onium salt system. A solution was prepared containing 4% of a triarylsulfonium salt of hexafluorophosphate in a commercial cycloaliphatic epoxy resin (Union Carbide, Cyracure UVR-6100). The mixture was coated onto polyethylene and irradiated at various dosages with a 160 Kev electron beam. A dose of 12.0 Mrads was required to produce a tack-free coating. In addition, a post-cure period of about 30 sec. at room temperature was needed to reach a tack-free state. Even after a dose of 20 Mrads the coating could be completely removed by 4 rubs with methylethyl ketone.

EXAMPLE V

This example illustrates the differences in the coating cured by UV irradiation compared to the electron beam cured coatings in Example III. A solution was prepared by mixing 9.1 grams of triethylene glycol divinyl ether, 0.9 grams of a cellulose acetate propionate, and 0.3 grams of a triarylsulfonium salt. The mixture was coated onto a polyethylene laminated substance and irradiated in a Rayonet RPR 100 photochemical reactor equipped with low pressure mercury arc lamps. Samples were given exposures ranging from 3 to 60 sec. A tack-free coating was formed with minimum exposure of 7.0 sec. All samples have a strong unpleasant odor which was not observed in Examples I–III. In addition the UV cured samples have lower gloss and an uneven appearance suggesting that phase separation may have occurred rather than a true semi-interpenetrating network.

I claim as my invention:

1. A polymerizable composition comprising a mixture of a vinyl ether, a cellulose ester, and a polymerization catalyst comprising an onium salt.

2. A polymerizable composition as set forth in claim 1 in which said vinyl ether is present in said mixture in a range of from about 60% to about 95% by weight of said mixture and said cellulose ester is present in said mixture in a range of from about 5% to about 40% by weight of said mixture.

3. A polymerizable composition as set forth in claim 1 in which said vinyl ether is an aliphatic vinyl ether.

4. A polymerizable composition as set forth in claim 1 in which said vinyl ether is an aralkyl vinyl ether.

5. A polymerizable composition as set forth in claim 1 in which said vinyl ether is an arylalkoxy vinyl ether.

6. A polymerizable composition as set forth in claim 3 in which said vinyl ether is diethylene glycol divinyl ether.

7. A polymerizable composition as set forth in claim 3 in which said vinyl ether is triethylene glycol divinyl ether.

8. A polymerizable composition as set forth in claim 3 in which said vinyl ether is 1,4-divinyloxybutane.

9. A polymerizable composition as set forth in claim 5 in which said vinyl ether is bisphenol-A-diethoxy vinyl ether.

10. A polymerizable composition as set forth in claim 1 in which said cellulose ester comprises a cellulose acetate butyrate.

11. A polymerizable composition as set forth in claim 1 in which said cellulose ester comprises a cellulose acetate propionate.

12. A polymerizable composition as set forth in claim 1 in which said cellulose ester is partially substituted with acrylamide groups.

13. A polymerizable composition as set forth in claim 1 in which said onium salt catalyst comprises 4-di-t-butylphenyl iodonium hexafluoroantimony.

14. A polymerizable composition as set forth in claim 1 in which said onium salt catalyst comprises triphenyl sulfonium hexafluorophosphate.

15. A polymeric composition comprising a semi-interpenetrating polymer network of a polyvinyl ether and a cellulose ester.

16. A polymeric composition as set forth in claim 15 in which said polyvinyl ether is present in the range of from about 60% to about 95% by weight of said composition and said cellulose esters present in a range of from about 5% to about 40% by weight of said composition.

17. A polymeric composition as set forth in claim 15 in which said polyvinyl ether comprises poly(diethylene glycol divinyl ether).

18. A polymeric composition as set forth in claim 15 in which said polyvinyl ether comprises poly(triethylene glycol divinyl ether).

19. A polymeric composition as set forth in claim 15 in which said polyvinyl ether comprises poly(1,4-divinyloxybutane).

20. A polymeric composition as set forth in claim 15 in which said cellulose ester comprises a cellulose acetate butyrate.

21. A polymeric composition as set forth in claim 15 in which said cellulose ester comprises a cellulose acetate propionate.

22. A polymeric composition as set forth in claim 15 in which said cellulose ester is partially substituted with acrylamide groups.

23. A process for the preparation of a polymeric composition comprising a semi-interpenetrating polymer network of a polyvinyl ether and a cellulose ester which comprises subjecting a mixture of at least one vinyl ether and a cellulose ester to irradiation from an electron beam at low dosages in the presence of a polymerization catalyst comprising an onium salt at polymerization conditions and recovering the resultant semi-interpenetrating polymer network composition.

24. A process as set forth in claim 23 in which said polymerization conditions include a temperature in the range of from about ambient to about 50° C.

25. A process as set forth in claim 23 in which said dosage from said electron beam is in a range of from about 0.1 to about 10.0 Mrads and from about 150 to about 300 Kev.

26. A process as set forth in claim 23 in which said vinyl ether comprises diethylene glycol divinyl ether.

27. A process as set forth in claim 23 in which said vinyl ether comprises triethylene glycol divinyl ether.

28. A process as set forth in claim 23 in which said vinyl ether comprises 1,4-divinyloxybutane.

29. A process as set forth in claim 23 in which said vinyl ether comprises bisphenol-A-diethoxyvinyl ether.

30. A process as set forth in claim 23 in which said cellulose ester comprises a cellulose acetate buterate.

31. A process as set forth in claim 23 in which said cellulose ester comprises a cellulose acetate propionate.

32. A process as set forth in claim 23 in which said ionium salt catalyst comprises 4-di-t-butylphenyl iodonium hexafluoroantimony.

33. A process as set forth in claim 23 in which said ionium salt catalyst comprises triphenyl sulfonium hexafluorophosphate.

* * * * *